United States Patent [19]

Iwamoto

[11] Patent Number: 5,043,963
[45] Date of Patent: Aug. 27, 1991

[54] MULTI-DISK PLAYER

[75] Inventor: Kenji Iwamoto, Higashihiroshima, Japan

[73] Assignee: Sharp Kabushiki Kaisha, Osaka, Japan

[21] Appl. No.: 490,424

[22] Filed: Mar. 8, 1990

[30] Foreign Application Priority Data

Mar. 25, 1989 [JP] Japan .................................. 1-72936

[51] Int. Cl.$^5$ ............................................ G11B 17/22
[52] U.S. Cl. ...................................... 369/36; 369/34; 369/75.2
[58] Field of Search ...................... 369/24, 30, 34, 36, 369/75.1, 75.2, 176, 178

[56] References Cited

U.S. PATENT DOCUMENTS 4,773,057  9/1988  Otsuka et al. ................. 369/75.2
4,839,881  6/1989  Takahara et al. ............... 369/75.2
4,893,295  1/1990  Matsuura et al. ............... 369/75.2

Primary Examiner—David Trafton
Assistant Examiner—Michelle S. Irvine

[57] ABSTRACT

A multi-disk player according to the invention has a disk table which comprises (1) a large size disk mounting section on which a large size disk is mounted, (2) a turn table rotatable about an axis which is a predetermined eccentric distance away from the axis of the large size disk mounting section. The turn table includes thereon a plurality of small size disk mounting sections on each of which a small size disk is placed. The eccentric distance is determined such that the axis of each small size disk mounting section is made to coincide with the axis of the large size disk mounting section by rotating the turn table.

The player having such an arrangement has a disk driving device whose circuit structure is simplified, and solely plays a plurality of types of disks having different diameters such as CDs and LDs.

Further the player plays a disk arbitrarily selected from a plurality of small size disks and successively plays a plurality of small size disks.

15 Claims, 6 Drawing Sheets

MULTI-DISK PLAYER

FIELD OF THE INVENTION

The present invention relates to multi-disk players capable of playing a plurality of types of disks having different diameters, i.e., small size disks such as CD-SINGLEs, CDs, and CD-Vs; and large size disks such as LDs.

BACKGROUND OF THE INVENTION

CD (compact disk) players have considerably improved in sound quality when compared with conventional LP (long play) record players, and are undergoing further development in order to be superior in the aspect of functional and operational performance. In disks such as CDs, data to be reproduced such as music programs and a variety of control signals are recorded. In accordance with these control signals, a desired music program can be accessed in a short time and the music number and the playback time of the music program can be displayed.

The maximum recording capacity of such a CD is 74 minutes/one side and the spacing between the pits formed on the disk is approximately 1.6 μm. It is virtually impossible to distinguish the music programs when looking at the surface of the disk and hence, the control signals are simultaneously recorded in the CDs with the recording of the signals of music data to be reproduced. The control signal indicates a music number, the playback time of a music program, time elapsed since the start of reproducing the first program stored in the disk, and/or similar information. The music signal pairs with the control signal, and one frame of data is made up of this pair of signals and a synchronizing signal. Such frames are connected in cascade and stored in the recording area of the disk.

The CD player for reproducing music programs from the above disk comprises a PLAY button; a STOP button; ten keys for specifying a program; and a variety of operational buttons for one-touch selection. By operating the operational buttons, a designated position (a music number etc.) is input in order for the optical pick-up to access a desired program. The data input by the operational buttons are read out in the system control circuit and the designated position is stored. Then, the optical pick-up is moved toward the designated position and during this time the pick-up reads the control signals recorded in the disk in order to confirm whether it reaches the designated position. More concretely, each control signal read by the pick-up during the access operation is compared with the designated position, thereby obtaining the distance between the position where the pick-up is at present and the designated position, so that the pick-up is moved as necessary. Thus, the pick-up accesses a desired music program which is stored in the disk, through the above process.

In a LD (laser disk), color video signals and audio signals of 2 channels are recorded. Both video signals and audio signals are recorded in the form of FM (frequency modulation) signals at a constant angular velocity (CAV method) or constant linear velocity (CLV method). When employing the CAV method, a 30 cm LD has a recording capacity of one hour/two sides while a 20 cm LD has a capacity of 28 minutes/two sides. Special reproduction can be easily performed on data recorded with the CAV method.

On the other hand, when employing the CLV method, the recording capacity of a LD is doubled (i.e. a 30 cm LD has a capacity of 2 hours/two sides and a 20 cm LD has a capacity of 40 minutes/two sides). In this case, special reproduction cannot be performed.

In a player used for playing such LDs, a disk is rotated by a motor; a laser beam spot is projected on the recording surface of the disk; a change in the intensity of reflected light therefrom is converted into electric signals by a photodetector; and thereby data are reproduced. Since the frequency elements of signals read from LDs have a broad band-width, the S/N ratio of LDs is high and images obtained therefrom have good resolution compared with standard-type VTRs (video tape recorder).

A plurality of types of CDs and LDs are known which are different in size and multi-disk players capable of solely playing those different disks have been developed. A conventional multi-disk player is provided with a disk mounting section on which a large size disk is placed and another disk mounting section on which a small size disk is placed, these disk mounting sections being disposed in a row. The large size disk mounting section and small size disk mounting section are respectively provided with a driving motor (spindle motor) at the mounting position thereof.

However, in such a conventional player, two driving motors are necessary for playing multiple sizes of disks. That is, a driving motor for playing a large size disk (i.e. a LD) and one for playing a small size disk (i.e. a CD) are required. This results in an increase in the cost as well as the complexity of the circuit structure; besides, there is such a drawback that the whole configuration of the multi-disk player tends to be large and bulky since a large space is occupied by the disk tray.

Some small size disk players (i.e. CD players) are arranged to accommodate a plurality of disks having the same diameter at a time and play a disk selected from them, or successively play the plurality of disks. Such disk players capable of performing the above mentioned selective playing operation/successive playing operation can be used only for small size disks, since the space of the system is limited. Therefore, the development of multi-disk players, which have the capability to play not only small size disks but also large size disks such as laser disks, has been long awaited.

SUMMARY OF THE INVENTION

One of the objects of the present invention is to provide a small size multi-disk player, which is capable of reproducing music data and images from a small size disk as well as a large size disk, by rotating them with a single driving motor.

Another object of the present invention is to provide a multi-disk player which has a compact and simple circuit structure and is capable of performing selective playing operation/successive playing operation with a plurality of small size disks having different diameters.

In order to accomplish the foregoing objects, a multi-disk player according to the present invention is provided with a turn table having a plurality of small size disk mounting sections, the axis of each small size disk mounting section being made to coincide with the axis of a large size disk mounting section by rotating the turn table.

With such an arrangement, a plurality of small size disks having different diameters are placed in a plurality of small size disk mounting sections disposed in the turn table and the turn table is rotated so that a desired small size disk is set with its center on the axis of the large size disk mounting section, whereby selective playing operation or successive playing operation can be performed on a plurality of small size disks. It is also possible to play a large size disk by placing the disk on the large size disk mounting section. Any disk to be played by the multi-disk player is accordingly set with its center on the axis of the large size disk mounting section and therefore, a plurality of types of disks can be driven by a single driving motor. In addition, since the large size disk mounting section and small size disk mounting sections are disposed on the same disk table, the player can be made compact.

The further objects, features and advantages of the present invention will become more apparent to those skilled in the art from the ensuing detailed description of preferred embodiments, reference being made to the accompanying drawings.

BRIEF DESCRIPTION OF THE DRAWINGS

FIG. 1 is a perspective view showing the external appearance of the principal part of a multi-disk player according to the present invention showing a condition in which no disk is set in the player and a disk tray 1 is not loaded in a box-type frame 2;

FIG. 2 is a plan view of a disk tray;

FIG. 3 is a plan view showing the disk tray in which a small size disk 11b is set in a readable condition when performing successive playing operation on a plurality of small size disks;

FIG. 4 is a plan view showing the disk tray in which a small size disk lac is set in a readable condition: the disk 11c is to be read after a turn table is rotated changing from the state shown in FIG. 3, upon completion of read operation on the disk 11b;

FIG. 5 is a plan view showing the disk tray in which the turn table is rotated to a predetermined position and a 20 cm LD (laser disk) is placed on a large size disk mounting section;

FIG. 6 is a plan view showing the disk tray in which the turn table is rotated to a predetermined position and a 30 cm laser disk is placed on the large size disk mounting section.

DESCRIPTION OF THE EMBODIMENTS

Referring now to FIGS. 1 to 6, one embodiment of the present invention will be described hereinbelow.

Figure 1:
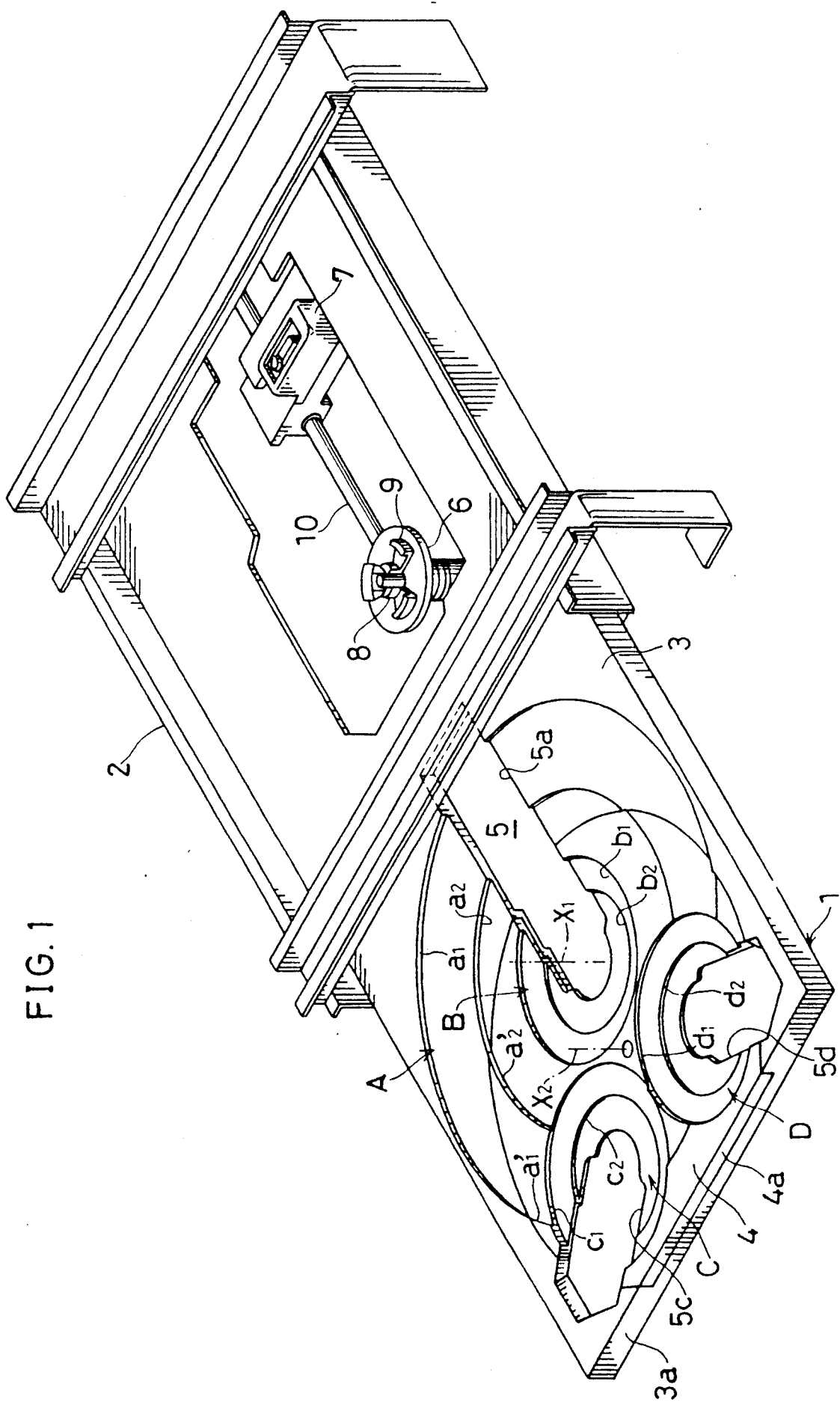
FIGS. 1 to 6 show one embodiment of the present invention.

FIG. 1 shows the external appearance of a multi-disk player according to the invention, the player being in a condition in which a disk tray is not loaded in a box-type frame 2 and no disk is set in the player. The disk tray can be forwardly/backwardly moved, thereby being installed in and removed from the box-type frame 2 of the main body of the multi-disk player. This disk tray 1 is comprised of a rectangular disk table 3 and a substantially disc-shaped turn table 4 which is supported by the disk table 3.

Recessed areas $a_1$ and $a_2$, each of which is partially arced, are concentrically formed on the upper face of the disk table 3 with their axis $X_1$ substantially positioned at the center of the disk table 3. Formed on the face of the turn table 4 are partially arced recessed areas $a_1'$ and $a_2'$ which extend in a continuous manner from the recessed areas $a_1$ and $a_2$ respectively. A large size disk mounting section A is made up of these recessed areas $a_1$, $a_2$, $a_1'$ and $a_2'$. The recessed areas $a_1$ and $a_1'$ form a space for accommodating a 30 cm laser disk while the recessed areas $a_2$ and $a_2'$ form a space for accommodating a 20 cm laser disk.

Figure 2:
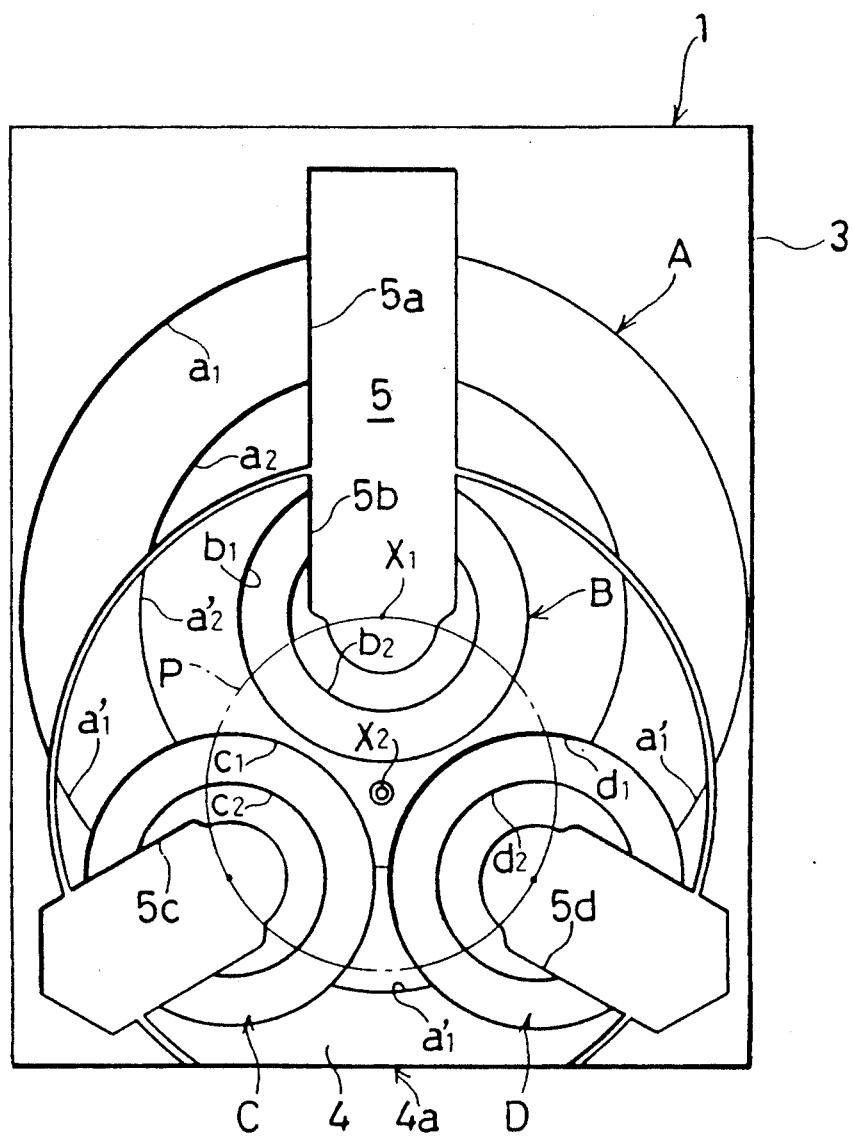

As shown in FIG. 2, the turn table 4 is rotatably disposed about the axis $X_2$ of a shaft which is eccentric with the axis $X_1$ of the large size disk mounting section A. Three small size disk mounting sections B, C and D are disposed with their axes on the circumference of a circle P (indicated by a chain line) drawn round the axis $X_2$. The axis $X_1$ is also positioned on the circumference of the circle. When the circle is sectored by three lines which connect the axis $X_2$ and the respective axes of small size disk mounting sections B, C and D, the central angle of each sector is 120°. The small size disk mounting sections B, C and D comprise circular recessed areas $b_1$, $b_2$; $c_1$, $c_2$; and $d_1$, $d_2$ respectively. The recessed areas $b_1$, $c_1$ and $d_1$ each accommodate a 12 cm CD (compact disk) and 12 cm CD-V (compact disk video) and the recessed areas $b_2$, $c_2$ and $d_2$ accommodate a 8 cm CD. The recessed area $b_1$ is concentric with the recessed area $b_2$; the recessed areas $c_1$, $c_2$ and $d_1$, $d_2$ are formed in the same manner. The CD-V has a capacity of storing, in its recording area, digital sound 20 minutes long within a 37 mm radius; and analog images and CD digital sound which are 5 minutes long, out of a 39 mm radius. The above digital sound (stored within a 37 mm radius) has a substantially similar quality to that stored in a CD, and the NTSC color television method is employed in forming the above analog images.

The large size disk mounting section A is provided with an opening 5a formed in its radial direction in which the disk table 3 is loaded in a box-type frame 2. The small size disk mounting sections B, C and D are provided with openings 5b, 5c and 5d respectively in their radial directions. When the small size disk mounting section B is positioned so as to be concentric with the large size disk mounting section A (i.e. the axis of the mounting section B is coincident with the axis $X_1$), the opening 5b and the opening 5a overlap each other so as to form a rectangular hole 5 whose opposing longer sides are parallel. The openings 5c and 5d are formed in the same manner with respect to the opening 5a. When the disk tray 1 is loaded in the frame 2, the rectangular hole 5 made up of the opening 5a and any one of the openings 5b to 5d permits the relative movement of a disk driving section 6 disposed within the frame 2 (see FIG. 1) in upward and downward directions. In addition, the rectangular hole 5 permits the optical pick-up 7 to linearly move along a guide shaft 10 in the radial direction of the disk.

When the disk tray 1 with a desired disk placed thereon is loaded in the frame 2, the center of the disk driving section 6 is positioned on the axis $X_1$ of the large size disk mounting section A. The disk driving section 6 is rotated at a fixed high rotational speed by a driving motor (spindle motor) which is not shown in the drawing. In this embodiment, the positions of the disk driving section 6 and the optical pick-up 7 are fixed in a vertical direction while the disk tray 1 loaded in the frame 2 is moved downwardly, but the arrangement is not limited to this. For example, the disk driving section 6 and the optical pick-up 7 may be moved upwardly toward the loaded disk tray 1.

Positioned on the upper face of the disk driving section 6 are a centering hub 8 for supporting a CD, CD-V or CD-SINGLE and a centering hub 9 for supporting a 20 cm LD (laser disk) or 30 cm LD.

The turn table 4 takes the form of a circle from which a D-shaped portion is cut away, in its plan view. A cut end 4a becomes flush with a forward end 3a of the disk table 3 when the turn table 4 is rotated to a predetermined position (i.e. the cut end 4a is in a reference position) so that the turn table 4 does not project but is fittingly installed within the disk table 3.

Figure 3:
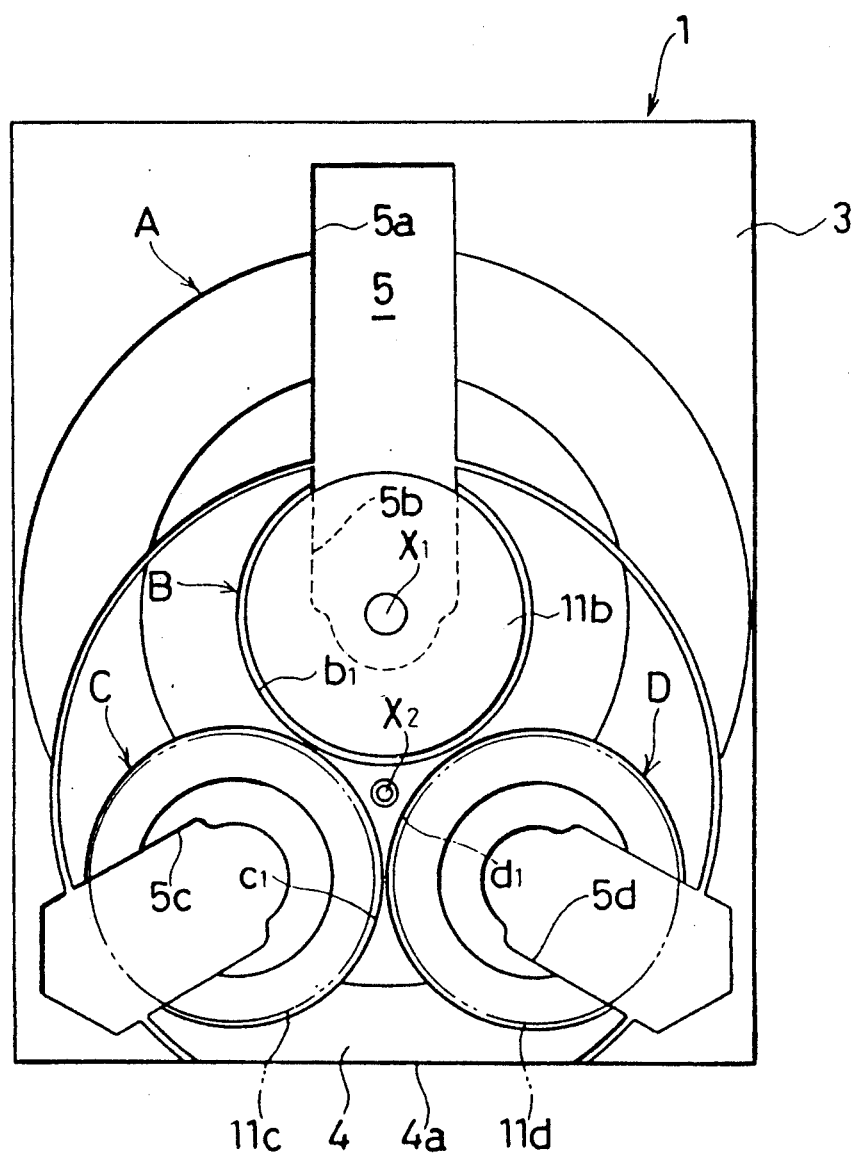
Figure 4:
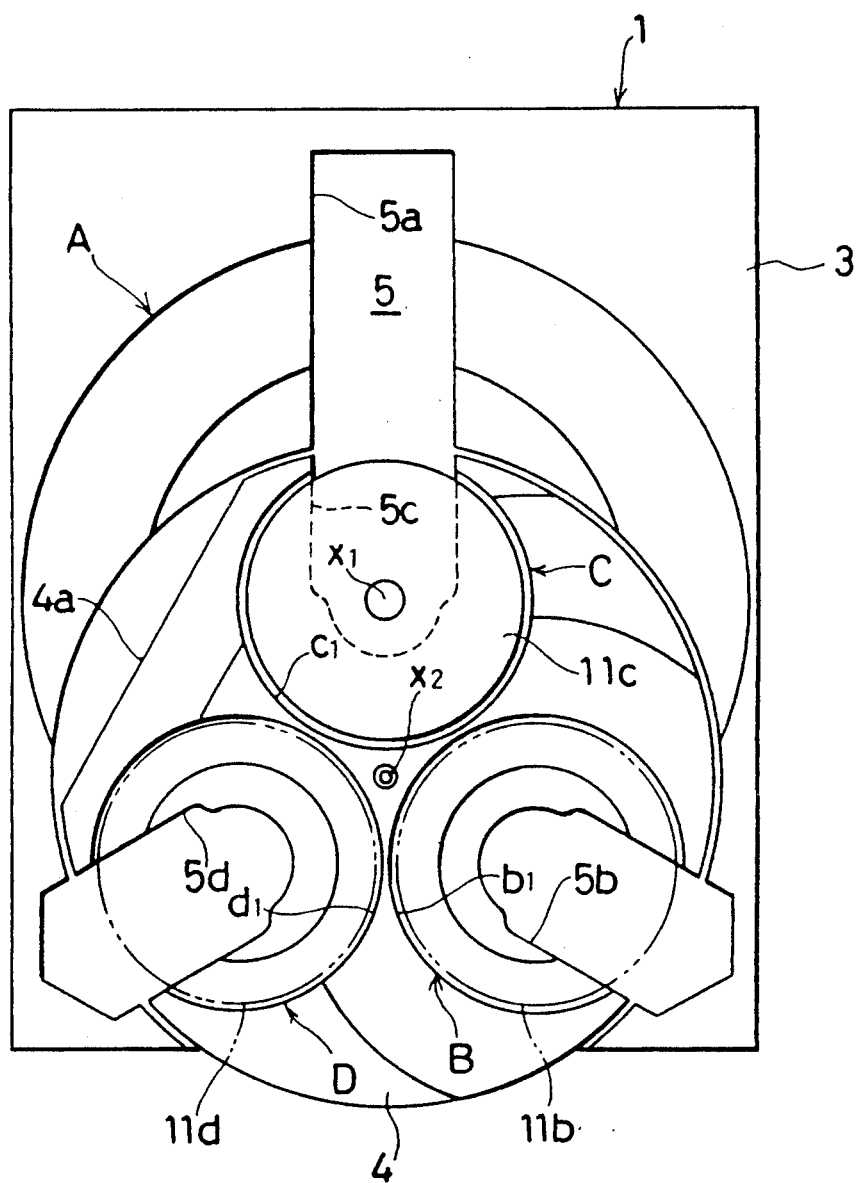

More specifically, the multi-disk player of the invention is provided with turn table resetting means (not shown) for resetting the turn table 4 in a predetermined position with the cut end 4a in a reference position. When a part of the circumference of the turn table 4 projects from the forward end 3a of the disk table 3 as shown in FIG. 4, the turn table resetting means sets the turn table 4 in the predetermined position so that the cut end 4a becomes flush with the forward end 3a of the disk table 3 as shown in FIG. 3. For example, when successive playing operation (program reproduction) is completed, or before the turn table 4 is set in a condition in which a large size disk or small size disk can be mounted on the corresponding disk mounting section or removed therefrom (i.e. before the unloading of the disk tray 1 is started), the turn table resetting means is actuated by operating a key switch disposed on an operation panel (not shown) of the multi-disk player so that the cut end 4a is turned to the reference position. With the above arrangement, wherever the turn table 4 is positioned at the time the turn table resetting means issues an instruction, the cut end 4a is returned to the reference position before the disk tray is unloaded. Therefore, whenever the disk tray 1 is in an unloading state, a large size disk can be securely mounted on the large size disk mounting section A.

As mentioned above, a part of the circumference of the turn table 4 does not project from the forward end 3a except the period during the multi-disk player plays a disk. As a result, the multi-disk player can be safely stored without occupying a large space, especially when the player is put aside for a long time. Further, the player can be compactly packed at the time of transport/shipment. There is also such an advantage that the positions of the small size disk mounting sections B, C and D can be easily checked when the cut end 4a is in the reference position.

Reference will be made to FIGS. 3 to 6 for explaining the operation of the multi-disk player having the foregoing construction.

Referring now to FIGS. 3 and 4, a case will be described, in which three disks are arbitrarily selected from a plurality of types of small size disks (i.e. CDs, CD-Vs and CD-SINGLEs) in order to perform successive playing operation.

Suppose a disk 11b is set in the recessed area $b_1$ of the small size disk mounting section B on the turn table 4; a disk 11c in the recessed area $c_1$ of the small size disk mounting section C; and a disk 11d in the recessed area $d_1$ of the small size disk mounting section D, as shown in FIG. 3. Each of these disks 11b, 11c and 11d is any one of a CD, CD-V and CD-SINGLE and in the case a CD-SINGLE is employed as the disk 11b for example, it will be set in the recessed area $b_2$. Likewise, the recessed areas $c_2$ and $d_2$ will be used for accommodating CD-SINGLEs.

Read operations are successively performed on the disks 11b, 11c and 11d which have been set as described above, in the order specified by the user's instruction. For instance, when the user instructs to successively play the disks 11b, 11c and 11d in this order, the turn table 4 rotates clock-wise or counterclock-wise so that the center of the disk 11b is positioned on the axis $X_1$ as shown in FIG. 3, thereby selecting the disk 11b. The disk 11b is then supported by the centering hub 8 so as to be ready for read operation. Thereafter, the disk driving section 6 rotates at a fixed rotational speed and the optical pick-up 7 reads data from the disk 11b.

Upon completion of the read operation on the disk 11b, the turn table 4 rotates changing from the state shown in FIG. 3 to the state shown in FIG. 4 (i.e. the turn table 4 rotates in a clock-wise direction when looking at the device from above), thereby selecting the disk 11c. The disk 11c is supported by the centering hub 8 so as to be ready for read operation. Thereafter, the disk driving section 6 rotates at a fixed rotational speed and the optical pick-up 7 reads data from the disk 11c.

Upon completion of the read operation on the disk 11c, the turn table 4 further rotates changing from the state shown in FIG. 4 (in a clock-wise direction when looking at the device from above), thereby selecting the disk 11d. Read operation is performed on the disk 11d in the same manner as the foregoing.

In the case when the user instructs to successively play the disks 11b, 11d and 11c in this order, the turn table 4 firstly rotates clock-wise or counterclock-wise so that the center of the disk 11b is positioned on the axis $X_1$ as shown in FIG. 3, thereby selecting the disk 11b for read operation.

Upon completion of the read operation on the disk 11b, the turn table 4 rotates changing from the state shown in FIG. 3 (in a counterclock-wise direction when looking at the device from above), thereby selecting the disk 11d for read operation.

Upon completion of the read operation on the disk 11d, the turn table 4 further rotates (in a counterclock-wise direction when looking at the device from above), so as to be in the condition shown in FIG. 4, thereby selecting the disk 11c for read operation.

In this embodiment, a desired disk can be selected from a plurality of types of disks in order to perform read operation, by appropriately rotating the turn table 4. A single spindle motor is hence enough to be employed in the disk driving section 6. In the foregoing description, three small size disks are employed for convenience of explanation, but the number of disks is not limited to this.

Figure 5:
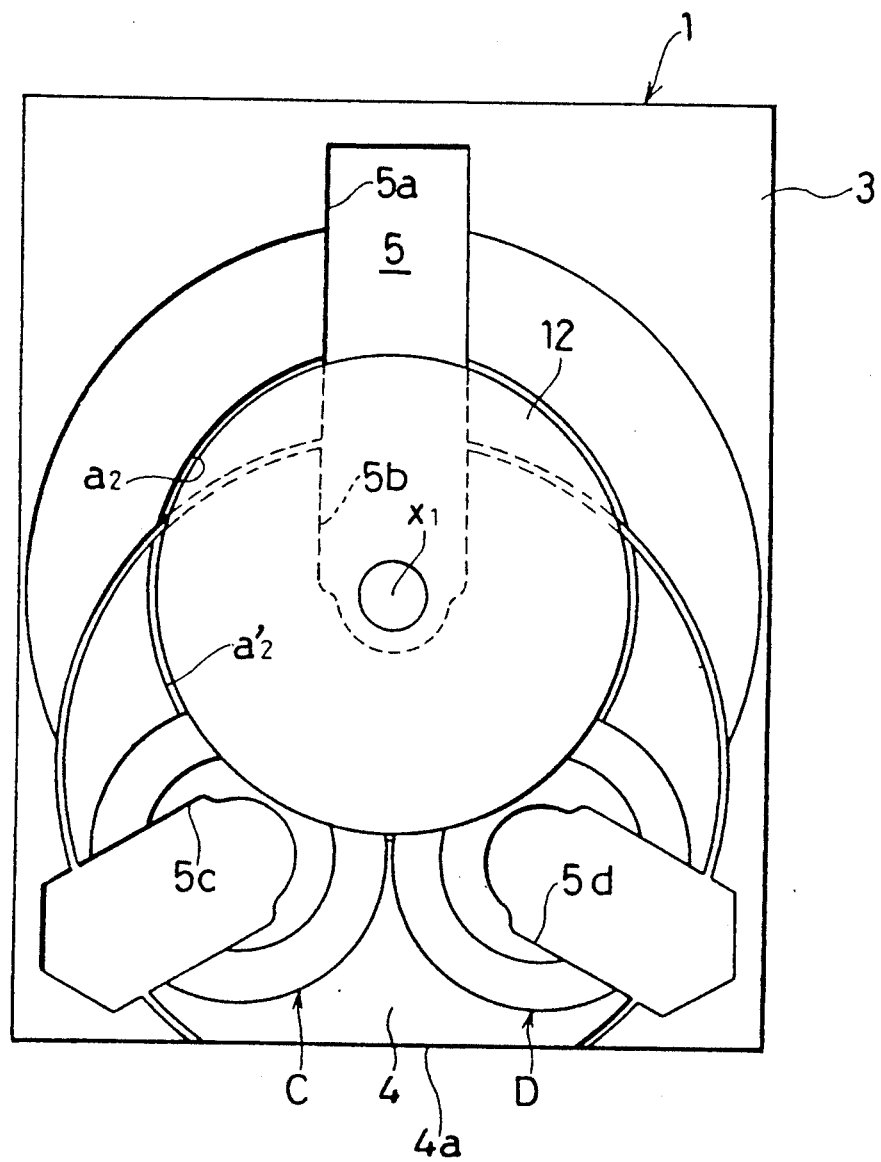

Next, reference will be made to FIG. 5 for explaining a case in which a disk 12 (20 cm LD) is played.

First of all, a 20 cm laser disk 12 is set in the recessed areas $a_2$ and $a_2'$ in the large size disk mounting section A, with the turn table 4 in a predetermined position. The laser disk 12 is then supported by the centering hub 9 so as to be ready for read operation. The disk driving section 6 rotates at a fixed rotational speed and the optical pick-up 7 reads data from the disk 12.

Figure 6:
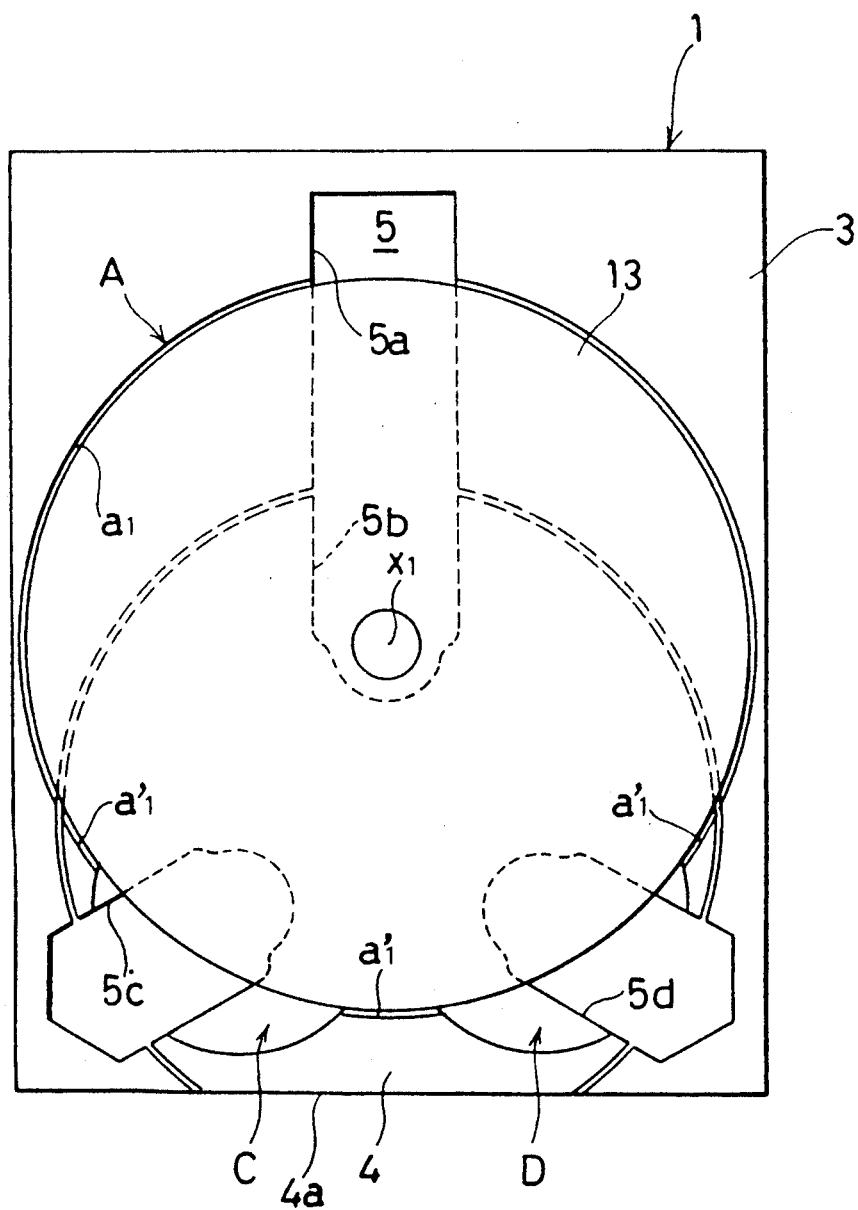

The following description describes a case with reference to FIG. 6, in which a disk 13 (30 cm LD) is played.

The turn table 4 is set in the predetermined position and the 30 cm laser disk 13 is placed on the recessed areas $a_1$ and $a_1'$ in the large size disk mounting section, whereby the disk 13 can be played like the forgoing case in which the disk 12 is employed.

According to the present invention described above, a single multi-disk player can play the 20 cm laser disk 12 and 30 cm laser disk 13 in addition to the small size disks 11b, 11c and 11d.

The turn table 4 may be rotated manually or rotated by driving means such as a motor. Such a motor is, for instance, disposed in the main body of the multi-player in such a manner that the motor can be engaged/disengaged with a shaft located in the turn table 4.

A multi-disk player according to the invention is designed such that the axis of each small disk mounting section can be coincident with the axis of the large size disk mounting section by rotating the turn table.

With the above arrangement, the multi-disk player can play a plurality of types of disks having different diameters such as CDs and LDs, by placing a desired type of disk on the large size disk mounting section or one of the small size disk mounting sections. Further, selective playing operation and successive playing operation can be performed on small size disks, by placing a plurality of small size disks on a plurality of small size disk mounting sections positioned on the turn table. Further, it is possible to play a plurality of types of disks with a single driving motor, since any small size disk to be played is set in a position which can be concentric with the large size disk mounting section by rotating the turn table. The driving motor and the structure of the circuit pertinent thereto are thus simplified, so that the overall cost can be reduced. The turn table is incorporated in the disk table, and the disk tray can be formed in a size substantially equivalent to a large size disk. This contributes to the miniaturization of the multi-disk player.

The invention being thus described, it may be obvious that the same may be varied in many ways. Such variations are not to be regarded as a departure from the scope of the invention. There are described above novel features which the skilled man will appreciate give rise to advantages. These are each independent aspects of the invention to be covered by the present application, irrespective of whether or not they are included within the scope of the following claims.

What is claimed is:

1. A multi-disk player having a disk table which comprises a large size disk mounting section on which a large size disk is mounted; and a turn table rotatable about an axis which is a predetermined eccentric distance away from the axis of the large size disk mounting section, wherein said turn table includes thereon a plurality of small size disk mounting sections on each of which a small size disk is placed and said eccentric distance is determined such that the axis of each small size disk mounting section is made to coincide with the axis of the large size disk mounting section by rotating the turn table.

2. The multi-disk player according to claim 1, wherein said large size disk mounting section accommodates a plurality of types of large size disks having different diameters.

3. The multi-disk player according to claim 2, wherein said large size disk mounting section accommodates a 20 cm LD and 30 cm LD.

4. The multi-disk player according to any one of claims 1 to 3, wherein said small disk mounting sections respectively accommodate a plurality of types of small size disks having different diameters.

5. The multi-disk player according to claim 4, wherein said small size disk mounting sections respectively accommodate a 12 cm CD, 12 cm CD-V and 8 cm CD-SINGLE.

6. The multi-disk player according to claim 4, wherein said turn table is used for a plurality of types of disks to be played.

7. The multi-disk player according to claim 1, further comprising a box-type frame in and from which said disk table is installed and removed.

8. The multi-disk player according to claim 1, wherein said large size disk mounting section includes a plurality of recessed areas for securely accommodating a plurality of types of disks having different diameters, said areas being concentrically formed in such a way that a corresponding disk fits to each area when the disk is placed on the large size disk mounting section.

9. The multi-disk player according to claim 1, wherein said small disk mounting section each include a plurality of recessed areas for securely accommodating a plurality of types of disks having different diameters, said areas being concentrically formed in such a way that a corresponding disk fits to each area when the disk is placed on the small size disk mounting section.

10. The multi-disk player according to claim 1, wherein said turn table takes the form of a circle from which a D-shaped portion is cut away, when seeing from above, so that a cut end becomes flush with a forward end of the disk table and the turn table fails to project but is fittingly installed within the disk table when the turn table is rotated to a predetermined position with the cut end in a reference position.

11. The multi-disk player according to claim 10, further comprising turn table resetting means by which the cut end is reset in the reference position automatically or upon receipt of an instruction issued by the user, when the cut end is not flush with the forward end of the disk table.

12. The multi-disk player according to claim 1, which further comprises an optical pick-up for solely reading data from a plurality of types of disks.

13. The multi-disk player according to claim 12, further comprising a disk driving section for rotating a disk and a guiding shaft for guiding the optical pick-up in a radial direction of the disk.

14. The multi-disk player according to claim 13, wherein said large disk mounting section comprises an opening which allows the relative upward/downward movement of the disk driving section and the movement of the optical pick-up along the guide shaft in a radial direction of the disk.

15. The multi-disk player according to claim 14, wherein each of said small size mounting sections comprises an opening which is overlapped with the opening of the large size disk mounting section when the small size mounting section is selected for use, so as to permit the movement of the optical pick-up along the guiding shaft.

* * * * *